F. E. LONG.
JOURNAL BEARING.
APPLICATION FILED APR. 3, 1911.

1,124,481.

Patented Jan. 12, 1915.

Witnesses
O. B. Baenziger.
V. C. Spratt.

Inventor
Frank E. Long
By Parker & Burton
Attorneys

UNITED STATES PATENT OFFICE.

FRANK E. LONG, OF DETROIT, MICHIGAN.

JOURNAL-BEARING.

1,124,481.  Specification of Letters Patent.  Patented Jan. 12, 1915.

Application filed April 3, 1911. Serial No. 618,506.

*To all whom it may concern:*

Be it known that I, FRANK E. LONG, a citizen of the United States, residing at Detroit, county of Wayne, State of Michigan, have invented a certain new and useful Improvement in Journal-Bearings, and declare the following to be a full, clear, and exact description of the same, such as will enable others skilled in the art to which it pertains to make and use the same, reference being had to the accompanying drawings, which form a part of this specification.

This invention relates to journal bearings. It has for its object an improved cage construction for confining in place between two track members a set of anti-friction balls. The balls are not only confined properly between the track members, but are also equally spaced and arranged to prevent any one of the set of balls from engaging against any other of the set.

Figure 1:
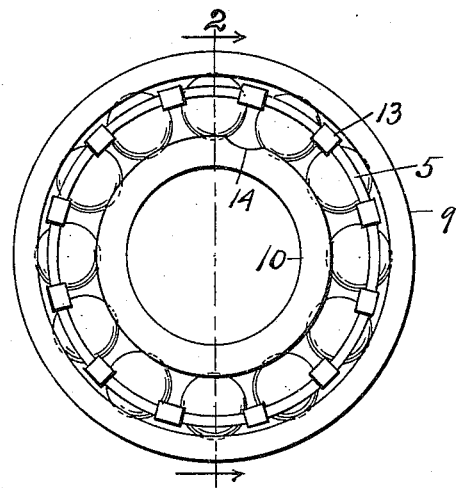
Figure 2:
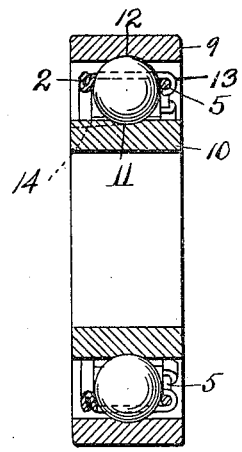
Figure 3:
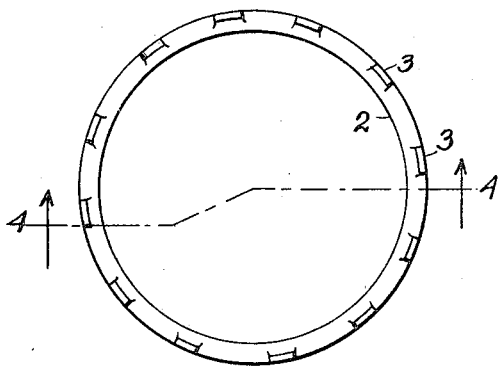
Figure 5:
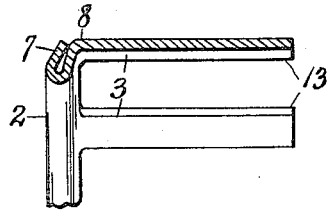
Figure 4:
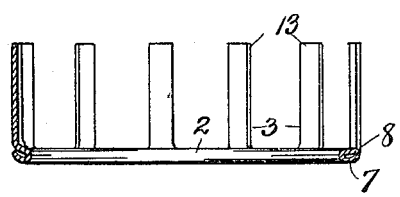
Figure 6:
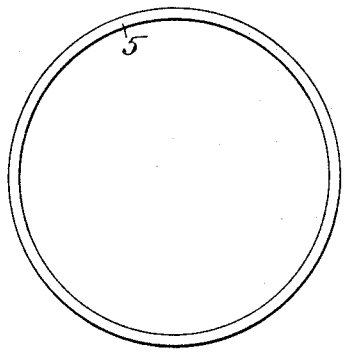

In the drawings:—Figure 1, is an elevation of the assembled track members, balls and cage. Fig. 2, is a section longitudinal of the axis. Fig. 3, is an elevation showing the ring member 2. Fig. 4, is a section at the line 4—4 of Fig. 3, and with the spacing member 3 shown as parallel to the axis of the bearing. Fig. 5, is an enlarged detail showing the construction at the junction of the ring member 2 and the spacing member 3. Fig. 6, is an elevation of the second ring 5.

The cage is made with two rings 2 and 5 spaced apart by a plurality of spacing members 3 which also serve as ties to tie the two rings properly together. The ring 2 is preferably made integral with the spacing members 3 and comprises a ring of sheet metal which is doubled on itself with folds 7 and 8 which lie in parallel relation; from the fold 8 rise a plurality of spacing members 3 which project from the face of the ring, and in the finished structure are parallel with the axis of the bearing. A ring 5 of a diameter to engage within the circle of the spacing members 3 is held in place in the assembled structure by bent over ends of the spacing members 3 as is shown in Fig. 2. The balls are inserted before the ring 5 is secured in place with a ball between each two adjacent spacing members 3. The balls are held between an outer race ring 9 and an inner race ring 10, each of which is provided with a groove, the inner race ring 10 being provided with a groove 11, and the outer race ring 9 being provided with a groove 12. Balls are selected of suitable size to engage in the annual chamber between the two race rings, with each ball engaging in both the inner race 11 and the outer race 12. The inner race ring is provided with a notch 14 along which the balls are inserted in place, and after all the balls have been inserted each in its own particular space between the spacing members 3, the ring 5 is inserted inside the as yet unfinished cage and the ends 13 are turned over the ring 5, which is thus securely held in proper relation to the balls, forming a four-sided opening for each ball. The size of each opening is such that the ball cannot slip through, and the several balls of the bearing are thus held, spaced from each other, and confined to the races of the two race members. No one of the balls can escape from the race into the notch 14, but all are confined to their proper track. The cage may be easily removed by straightening the ends of the members 3, or as this is an inexpensive article, it may be destroyed if it be necessary to remove it to replace any one or more of the balls that may become worn, injured, or may be defective for any reason.

What I claim is:—

A ball-bearing, having in combination a pair of rings concentrically arranged and each provided with a race and one of the rings provided with an entrance notch leading into the race, anti friction balls insertible through said notch, a cage comprising a piece of metal cut into ring shape and completely doubled upon itself to form a bead, the said doubled portion carrying pronged or spacing members projecting perpendicularly from the plane of the folded portions and a second cage ring comprising an endless rod-like member adapted to lie on one side of the bearing balls after they have been inserted between the rings, the said first mentioned cage ring being adapted to be placed on the opposite side of the bearing balls and the prongs inserted between each pair of balls and the ends of prongs bent over the second cage ring, the second cage ring and the turned-over prongs approximating the bulk of the first cage ring by reason of the bead form of the latter so as to minimize unbalanced forces, substantially as described.

In testimony whereof, I sign this specification in the presence of two witnesses.

FRANK E. LONG.

Witnesses:
CHARLES F. BURTON,
VIRGINIA C. SPRATT.